United States Patent Office 3,471,513
Patented Oct. 7, 1969

3,471,513
2-(2-CARBOXYETHYL)-5-PHENYL-1-PYRROLE-
BUTYRIC ACID AND CONGENERS
Leland J. Chinn, Morton Grove, Ill., assignor to G. D.
Searle & Co., Chicago, Ill., a corporation of Delaware
No Drawing. Filed Nov. 1, 1966, Ser. No. 591,119
Int. Cl. C07d 27/26
U.S. Cl. 260—326.3
6 Claims

ABSTRACT OF THE DISCLOSURE

Preparation of the captioned compounds, such as 2-(2-carboxyethyl)-5-(m-ethoxyphenyl)-1-pyrrolebutyric acid, and their antibiotic and ulcer-inhibiting properties is disclosed.

This invention relates to 2-(2-carboxyethyl)-5-phenyl-1-pyrrolebutyric acid and congeners, and to processes for the preparation thereof. More particularly, this invention provides new, useful, and unobvious chemical compounds of the formula

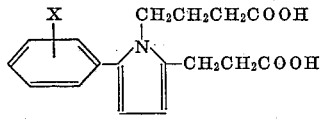

wherein X represents hydrogen, halogen, or an alkoxy radical. Among the halogens represented by X, fluorine, chlorine, and bromine are especially preferred, while the alkoxy radicals comprehended thereby are most desirably methoxy, ethoxy, propoxy, isopropoxy, butoxy, isobutoxy, pentyloxy, neopentyloxy (i.e., 2,2-dimethylpropoxy), hexyloxy, isohexyloxy, heptyloxy, and like monovalent, saturated, acyclic, straight- or branched-chain groupings of empirical formula

wherein $n$ represents a positive integer less than 8. The positioning of the phenyl substituent represented by X with respect to attachment of the phenyl nucleus to the pyrrole ring is not critical, ortho, meta, and para isomers alike being adapted to the purposes of this invention.

The subject compounds are useful by reason of their valuable pharmacological properties. Thus, for example, they are antibiotic agents effective against bacteria such as *Diplococcus pneumoniae*, algae such as *Chlorella vulgaris*, and Dicotyledoniae. They also inhibit ulcer formation.

Preparation of the subject compounds proceeds by heating an appropriate dioxoheptanoic acid

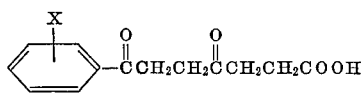

with 4-aminobutyric acid in the presence of p-toluenesulfonic acid monohydrate, using toluene as the reaction medium. (X in the latter formula retains the meaning previously assigned.)

The following examples describe in detail compounds illustrative of the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

EXAMPLE 1

2-(2-carboxyethyl)-5-phenyl-1-pyrrolebutyric acid

A mixture of 200 parts of 4,7-dioxo-7-phenyl-heptanoic acid, 110 parts of 4-aminobutyric acid, 15 parts of p-toluenesulfonic acid monohydrate, and 8,700 parts of toluene is heated at the boiling point under reflux for 6 hours, water being removed as formed. The resultant mixture is distilled nearly to dryness in vacuo. The residue is extracted with ether. The ether extract is washed with water, dried over anhydrous sodium sulfate, and stripped of solvent by vacuum distillation. The residue is 2-(2-carboxyethyl)-5-phenyl-1-pyrrolebutyric acid, having the formula

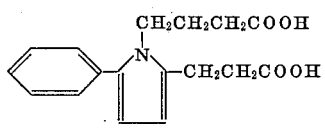

EXAMPLE 2

2-(2-carboxyethyl)-5-(p-fluorophenyl)-1-pyrrolebutyric acid

A mixture of 200 parts of 7-(p-fluorophenyl)-4,7-dioxoheptanoic acid, 110 parts of 4-aminobutyric acid, 15 parts of p-toluenesulfonic acid monohydrate, and 8,700 parts of toluene is heated at the boiling point under reflux for 6 hours, water being removed as formed. The resultant mixture is distilled nearly to dryness. The residue is washed with hexane and then crystallized from aqueous methanol, using decolorizing charcoal in process. The product thus isolated is 2-(2-carboxyethyl)-5-(p-fluorophenyl)-1-pyrrolebutyric acid, melting at 152–155°. It has the formula

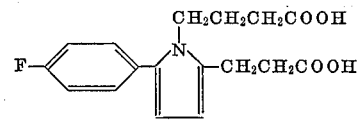

EXAMPLE 3

2-(2-carboxyethyl)-5-(p-chlorophenyl)-1-pyrrolebutyric acid

A mixture of 200 parts of 7-(p-chlorophenyl)-4,7-dioxoheptanoic acid, 110 parts of 4-aminobutyric acid, 15 parts of p-toluenesulfonic acid monohydrate, and 8,700 parts of toluene is heated at the boiling point under reflux for 6 hours, water being removed as formed. The resultant mixture is distilled nearly to dryness in vacuo, and the residue is extracted with ether. The ether extract is washed with water, dried over anhydrous sodium sulfate, and mixed with decolorizing charcoal. The mixture is filtered. The filtrate is stripped of solvent by vacuum distillation. The residue is crystallized from a mixture of ethyl acetate and hexane to give 2-(2-carboxyethyl)-5-(p-chlorophenyl)-1-pyrrolebutyric acid melting at 181.5–183.5°. The product has the formula

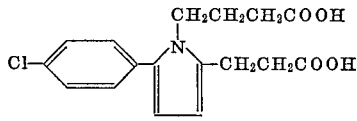

EXAMPLE 4

(A) 3'-bromo-3-(2-furyl)acrylophenone

A solution of 112 parts of m-bromoacetophenone, 96 parts of 2-furaldehyde, 15 parts of sodium methoxide, and 296 parts of methanol is allowed to stand at room temperatures for 16 hours. The precipitate which forms is filtered off, washed with aqueous 50% methanol, and dried in air. The product thus isolated is 3'-bromo-3-(2-furyl)acrylophenone.

(B) 7-(m-bromophenyl)-4,7-dioxoheptanoic

A mixture of 33 parts of 3'-bromo-3-(2-furyl)acrylophenone, 480 parts of ethanol, and 180 parts of concentrated hydrochloric acid is heated at the boiling point under reflux for 16 hours, then distilled to dryness in vacuo. The residue is mixed with 360 parts of concentrated hydrochloric acid, 300 parts of glacial acetic acid, and 600 parts of water. The mixture thus obtained is heated at the boiling point under reflux for 3 hours, then cooled to room temperature. Supernatant is decanted from the black tar which forms, and then chilled to 0°. The precipitate thrown down is filtered off, washed with water, and dried in air. The product thus isolated is 7-(m-bromophenyl)-4,7-dioxoheptanoic acid.

(C) 5-(m-bromophenyl)-2-(2-carboxyethyl)-1-pyrrolebutyric acid

A mixture of 200 parts of 7-(m-bromophenyl)-4,7-dioxoheptanoic acid, 110 parts of 4-aminobutyric acid, 15 parts of p-toluenesulfonic acid monohydrate, and 8,700 parts of toluene is heated at the boiling point under reflux for 6 hours, water being removed as formed. The resultant mixture is distilled nearly to dryness in vacuo. The residue is extracted with ethyl acetate. The ethyl acetate extract is washed with water, dried over anhydrous sodium sulfate, and stripped of solvent by vacuum distillation. The residue is 5-(m-bromophenyl)-2-(2-carboxyethyl)-1-pyrrolebutyric acid, having the formula

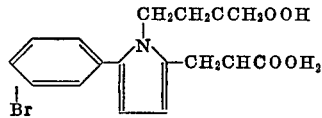

EXAMPLE 5

2-(2-carboxyethyl)-5-(p-methoxyphenyl)-1-pyrrolebutyric acid

Substitution of 200 parts of 7-(p-methoxyphenyl)-4,7-dioxoheptanoic acid for the 7-(m-bromophenyl)-4,7-dioxoheptanoic acid called for in Example 4(C) affords, by the procedure there detailed, 2-(2-carboxyethyl)-5-(p-methoxyphenyl)-1-pyrrolebutyric acid, having the formula

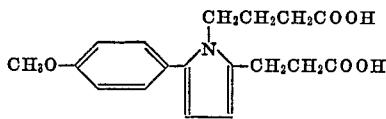

EXAMPLE 6

2-(2-carboxyethyl)-5-(m-ethoxyphenyl)-1-pyrrolebutyric acid

A mixture of 200 parts of 7-(m-ethoxyphenyl)-4,7-dioxoheptanoic acid, 110 parts of 4-aminobutyric acid, 15 parts of p-toluenesulfonic acid monohydrate, and 8,700 parts of toluene is heated at the boiling point under reflux for 15 hours, water being removed as formed. The resultant mixture is distilled nearly to dryness in vacuo. The residue is triturated with hexane. Insoluble solids are filtered off, washed with hexane, dried in air, and recrystallized from a mixture of ethyl acetate, ether, and hexane to give 2-(2-carboxyethyl)-5-(m-ethoxyphenyl)-1-pyrrolebutyric acid melting at 124–126.5°. The product has the formula

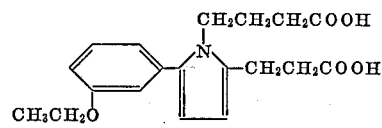

What is claimed is:
1. A compound of the formula

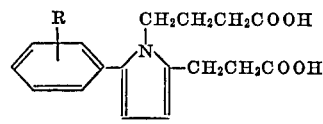

wherein R represents halogen of atomic number less than 53 or lower alkoxy.

2. A compound according to claim 1 wherein R represents fluorine, chlorine, or bromine.

3. A compound according to claim 1 which is 2-(2-carboxyethyl)-5-(p-fluorophenyl)-1-pyrrolebutyric acid.

4. A compound according to claim 1 which is 2-(2-carboxyethyl) - 5 - (p-chlorophenyl)-1-pyrrolebutyric acid.

5. A compound according to claim 1 wherein R represents lower alkoxy.

6. A compound according to claim 1 which is 2-(2-carboxyethyl) - 5 - (m-ethoxyphenyl)-1-pyrrolebutyric acid.

No references cited.

ALEX MAZEL, Primary Examiner

J. TOVAR, Assistant Examiner

U.S. Cl. X.R.
424—274